(12) United States Patent
Kuniavsky et al.

(10) Patent No.: US 11,853,653 B2
(45) Date of Patent: Dec. 26, 2023

(54) GENERATIVE DESIGN USING STYLE GRAMMARS

(71) Applicant: Accenture Global Solutions Limited, Dublin (IE)

(72) Inventors: Michael Kuniavsky, San Francisco, CA (US); Nicholas Akiona, San Jose, CA (US); Michael Nai-An Chen, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 328 days.

(21) Appl. No.: 17/192,370

(22) Filed: Mar. 4, 2021

(65) Prior Publication Data

US 2021/0279377 A1 Sep. 9, 2021

Related U.S. Application Data

(60) Provisional application No. 62/985,078, filed on Mar. 4, 2020.

(51) Int. Cl.
*G06F 30/12* (2020.01)
*G06F 40/253* (2020.01)
(Continued)

(52) U.S. Cl.
CPC ............ *G06F 30/12* (2020.01); *G06F 40/253* (2020.01); *G06F 2111/02* (2020.01);
(Continued)

(58) Field of Classification Search
CPC ..... G06F 30/12; G06F 40/253; G06F 2111/04; G06F 2111/16; G06F 2119/18; G06F 2111/02
See application file for complete search history.

(56) References Cited

U.S. PATENT DOCUMENTS

| 11,010,800 B2 * | 5/2021 | Norman | G06Q 30/0621 |
| 2019/0378204 A1 * | 12/2019 | Ayush | G06Q 30/0643 |
| 2020/0250731 A1 * | 8/2020 | Soohoo | G06N 5/022 |

OTHER PUBLICATIONS

J. A. Marzal, J. Antonio Diego-Mas, and G. Acosta-Zazueta, "A 3D shape generative method for aesthetic product design", pp. 144-176, (Year: 2019).*

(Continued)

*Primary Examiner* — Kibrom K Gebresilassie
(74) *Attorney, Agent, or Firm* — Fish & Richardson P.C.

(57) ABSTRACT

This document describes a generative design platform that uses style to generate product designs. In one aspect, a method includes receiving, from a client computing device of a user, data identifying a set of design parameters including a product template for a product and one or more style grammars for the product. Each style grammar includes a set of stylistic parameters that define aesthetic characteristics of a group of related products. One or more physical constraints on a design of the product are obtained. A set of candidate product designs for the product are generated based on the product template, each style grammar, and the one or more physical constraints. A set of scores are generated for each candidate product design based on an evaluation of the candidate product designs. A subset of the candidate product designs are selected based on the scores.

18 Claims, 4 Drawing Sheets

(51) Int. Cl.
 *G06F 111/02* (2020.01)
 *G06F 119/18* (2020.01)
 *G06F 111/16* (2020.01)
 *G06F 111/04* (2020.01)

(52) U.S. Cl.
 CPC ....... *G06F 2111/04* (2020.01); *G06F 2111/16* (2020.01); *G06F 2119/18* (2020.01)

(56) References Cited

OTHER PUBLICATIONS

Wikipedia.org [online], "Generative design," available on or before Nov. 30, 2009 via Internet Archive: Wayback Machine URL<https://web.archive.org/web/20091130205045/https://en.wikipedia.org/wiki/Generative_design> retrieved on Jan. 3, 2022, retrieved from URL<https://en. wikipedia.org/wiki/Generative_design>, 4 pages.
Yannou et al., "Evolutionary and interactive sketching tool for innovative car shape design," Mechanics and Industry, May 2013, 14(1):1-22.

\* cited by examiner

GENERATIVE DESIGN USING STYLE GRAMMARS

CROSS REFERENCE TO RELATED APPLICATIONS

This application claims the benefit under 35 U.S.C. § 119(e) of U.S. Patent Application No. 62/985,078, titled "GENERATIVE DESIGN USING STYLE GRAMMARS," filed Mar. 4, 2020. The disclosure of the foregoing application is incorporated herein by reference in its entirety for all purposes.

TECHNICAL FIELD

This specification relates to generative product design platforms.

BACKGROUND

Computer-aided design (CAD) is used across multiple industries for the design and manufacture of products. Generally, CAD programs boost the productivity of designers, reduce lead times in the concept-to-manufacture pipeline, and increase the overall quality of products. CAD programs enable designers to use computers to create, modify, analyze, and optimize product designs. Some CAD programs enable virtual testing of product designs prior to physical prototyping and/or manufacturing. The product design is stored in a computer-readable file (CAD file), which can be used in subsequent phases of the design process.

SUMMARY

This specification generally describes a generative design platform that uses style grammars that include aesthetic constraints to generate product designs that maintain key visual aspects of a core stylistic design.

Traditional CAD, where a single geometric model is laboriously manipulated by a highly trained expert, does not scale to one-off products. When you have "n of 1" manufacturing capability, every object can be different, such as objects produced using multi-material additive manufacturing, but the design burden is enormous. Generative design tools can iterate through many different designs and output product designs that meet a set of constraints. This process can automatically take into account constraints, such as strength, weight, and cost while being able to design things that fall outside of people's imaginations and past experiences. Generative design technology can use topological optimization to minimize material use while maintaining mechanical performance.

While generative design can be great at enhancing parts for features such as weight and cost, generative design can be enhanced by considering, as constraints, an organization's or a user's design aesthetic preferences. A generative design system based on style grammars can generate product designs that are based on aesthetic constraints, in addition to functional, manufacturing, cost, and/or other appropriate constraints.

Style grammars are geometric constraints that describe a design space with infinite variations, while maintaining key aspects of the core design vision. The style grammar-based generative design system described in this document provides a framework for developing product designs that fit the style of a brand or other group of related products. End users may not know explicitly what visual design elements define a company's in-house style. Such users can use style grammars in a generative design process to converge upon a set of designs that may be unique, but still retain the core characteristics of the brand. This enables individuals to make a one-off design that is manufacturable by computer-controlled tools, while having the overall style of the brand.

The use of style grammars in a generative design process increases the speed at which products that conform with a brand identity are designed, which can reduce the computational resources required to generate product designs. For example, using style grammars can reduce the number of iterations of a generative design process required to find a suitable product design that meets both performance constraints and stylistic constraints of a group of related products. Reducing the number of iterations to converge on suitable product designs reduces the computation burden placed on computing systems, freeing up resources for other tasks. This can enable the design of new products to scale exponentially rather than linearly due to the increase in speed and reduced number of iterations to find suitable designs.

In general, one innovative aspect of the subject matter described in this specification can be embodied in methods that include the actions of receiving, from a client computing device of a user, data identifying a set of design parameters including a product template for a product and one or more style grammars for the product. Each style grammar includes a set of stylistic parameters that define aesthetic characteristics of a group of related products. One or more physical constraints on a design of the product are obtained for the product. A set of candidate product designs are generated for the product based on the product template, each style grammar, and the one or more physical constraints. A set of scores are generated for each candidate product design by evaluating each candidate product design in the set of candidate product designs. The set of scores include a style score representing a measure of how well the candidate product design conforms to the aesthetic characteristics of each style grammar and a performance score representing a measure of how well the candidate product design satisfies one or more performance objectives for the product. A subset of the candidate product designs is selected based on the set of scores for each candidate product design. Data that causes the client computing device to present, for each candidate product design, a visual representation of the candidate product design is provided to the client computing device.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, each aesthetic constraint defined by each style grammar is a non-functional constraint that is unrelated to functionality of the group of products. In some aspects, the set of scores for each candidate product design includes a manufacturability score that represents a measure of manufacturability of the product using a specified manufacturing process.

Some aspects include generating one or more obstacle bodies based on the one or more style grammars. Each obstacle body specifies one or more areas of the product at which material cannot be added without departing from the aesthetic characteristics of the group of related products. Generating the set of candidate product designs for the product can include preventing material from being added at the one or more areas specified by each of the one or more obstacle bodies.

In some aspects, the stylistic parameters of a given style grammar defines at least one of (i) a three-dimensional physical relationship between two or more parts of the product, (ii) a size and/or position of a logo, (iii) a color scheme, (iv) one or more materials for the product, (v) a finish of the product, or (vi) geometric parameters defining characteristics of curves on one or more surfaces. In some aspects, the set of design parameters includes a user profile comprising user-specific design constraints.

In some aspects, receiving the data identifying the set of design parameters includes receiving selection data specifying selection of the one or more style grammars from a set of available style grammars.

Some aspects include, for each of one or more iterations, receiving, from the client computing device, selection data identifying selected candidate product designs selected by the user of the client computing device, identifying one or more similar characteristics between the selected candidate product designs, generating, based on the product template, each style grammar, the one or more physical constraints and the one or more similar characteristics, an updated set of candidate product designs for the product, and providing, to the client computing device, data that causes the client computing device to present, for each candidate product design in the updated set of candidate product designs, a visual representation of the candidate product design.

In some aspects, a first style grammar of the one or more style grammars defines a first set of stylistic parameters that define aesthetic characteristics of a type of product corresponding to the product and a second style grammar of the one or more style grammars defines a second set of stylistic parameters that define aesthetic characteristics of multiple types of products including the type of product corresponding to the product.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A generative design platform described in this document generates product designs using a generative design process that is based on a set of parameters that includes style grammars. A style grammar is a set of stylistic parameters that define aesthetic characteristics of a group of related products. A style grammar can define the aesthetic characteristics that are common to, or found in, a group of related products. For example, a company can generate style grammars that specify aesthetic constraints that match its brand. A style grammar can capture, parametrically, the brand's design aesthetics and user stylistic preferences such that a computer system can use the style grammar to generate product designs that conform to the design aesthetics and/or satisfies stylistic constraints imposed on the design by the parameters of the style grammar.

The generative design process can include generating a set of candidate product designs for a product based on a template for the product, one or more style grammars, physical constraints in the design of the product, e.g., required materials, size, relationship between parts, etc., and/or performance objectives for the product. The generative design process can include multiple iterations and, at each iteration, the generative design platform can score the candidate product designs based on multiple factors, e.g., how well the candidate product design conforms to the aesthetic characteristics of the style grammar(s), the functional performance of the candidate product design, the manufacturability of the candidate product design, and/or other appropriate factors. The generative process can perform multiple iterations until converging on a set of candidate product designs for which information is presented to a user.

After each iteration or a set of iterations, a user can select a subset of the candidates to fine tune the process for the next iteration. The platform can use the user selections to identify characteristics of the product design that are important to the user and use the feedback as parameters in the next iteration of the process. For example, the platform can identify similarities between the selected candidate product designs and/or their scores and use that information in the next iteration(s). The platform can also identify differences between the selected candidate product designs and the non-selected product designs and use those differences as parameters in the next iteration(s).

Using such a generative design process enables the platform to generate product designs that have the look and feel of a group of products, e.g., of a brand, while also satisfying the performance objectives for the product. It also enables the product designs to be adapted to user preferences using an iterative feedback process. Absent such techniques, it would be impractical for a company to generate many one-off products that have aesthetic characteristics that conform to the overall style of a brand.

Figure 1:
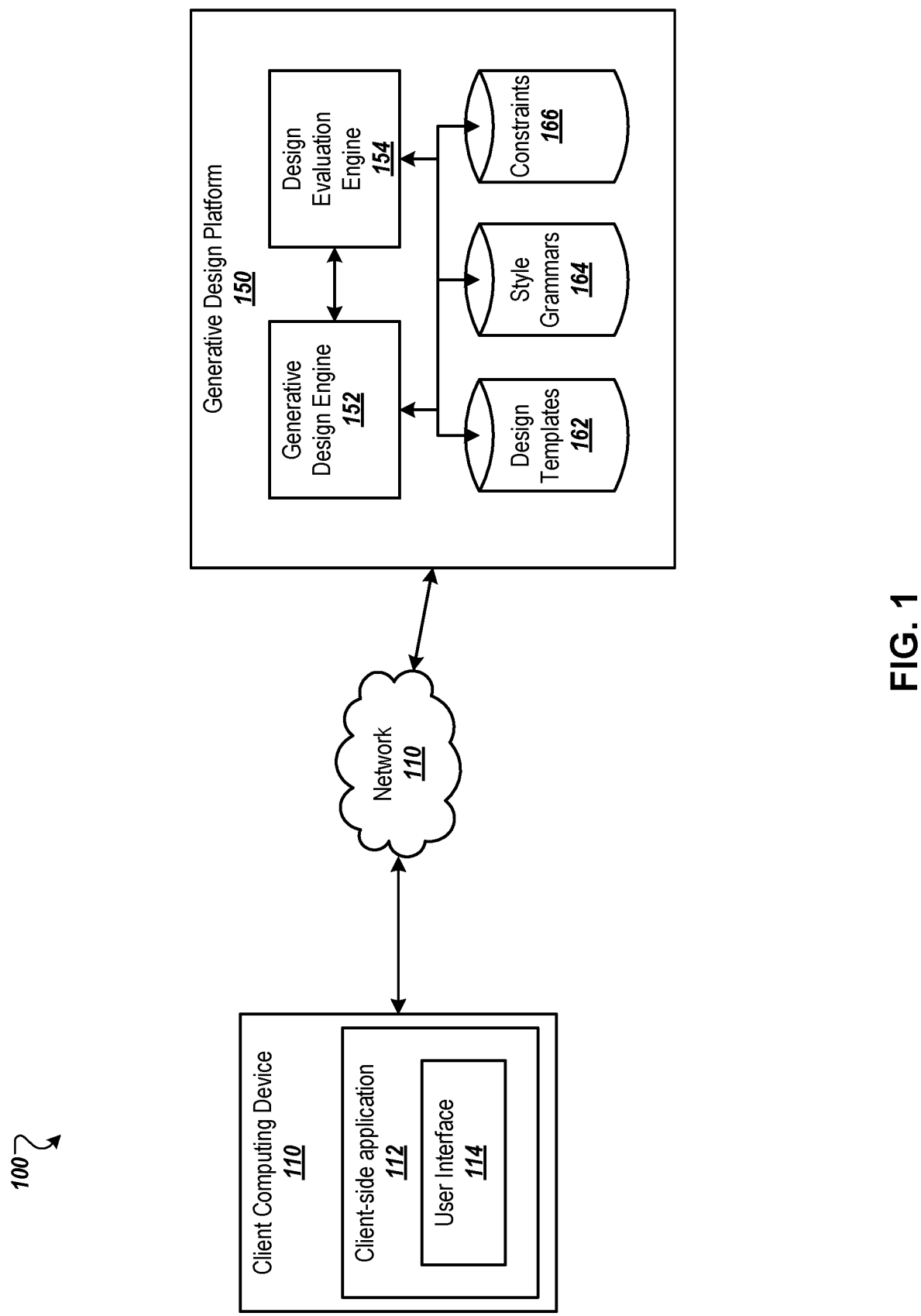
FIG. 1 shows an example environment in which a generative design platform generates product designs using style grammars.

FIG. 1 shows an example environment 100 in which a generative design platform 110 generates product designs using style grammars. The environment 100 includes a data communication network 110, such as a local area network (LAN), a wide area network (WAN), the Internet, a mobile network, or a combination thereof. The network 110 connects client computing devices 110 to the generative design platform 150.

The client computing device 110, which can be in the form of a personal computer or mobile device, includes a client-side application 112 that enables the user to interact with the generative design platform 150. For example, the client-side application 112 can generate and present user interfaces 114 that enable the user to interact with the generative design platform 114. This interaction enables the user to collaborate with the generative design platform 150 to generate product designs that have aesthetic characteristics that conform to the style of a brand or other group of related products.

The user interfaces 114 enable the user to select or otherwise provide inputs to the generative design process. These inputs can include, for example, a product template, one or more style grammars, information about another product with which the designed product will be used, and/or information about the user of the product. The inputs can also include user preferences for the style of the product, e.g., in the form of parameters defining visual characteristics of the product design.

The user interfaces 114 also enable the user to refine or customize the generative design process. For example, the generative design platform 150 can provide information about candidate product designs for display by the user interfaces 114. This information can include, for each candidate product design, a visual representation, e.g., a computer-generated image, of the candidate product design. This information can also include one or more scores related to the candidate product design. The user can select candidate product designs that the user prefers and the client-send application 112 can send information identifying the selected candidate product designs to the generative design platform 150. The candidate design platform 150 can then update the parameters for the generative design process for subsequent iterations based on the selected candidate design templates.

These interactive user interfaces enable users to access and understand the constraints needed for different product designs and different use cases, and improves their ability to generatively design products that are safe, efficient, and appealing to others. The user interfaces also enable close collaboration between a human user and a computing platform, which can include artificial intelligence (AI) engines such that the platform is an AI assistant in the design process. By providing scores related to aesthetics, performance, and manufacturability along with the visual representations of the candidate product designs, users can easily identify the characteristics that are important in the product design and better select candidate product designs that are used to update the next iteration of the generative design process.

The generative design platform 150, which can be in the form of one or more computers, includes a generative design engine 152 and a design evaluation engine 154. Although shown as two separate engines, the functionality of the two engines can be combined into the same software and/or hardware. The engines can employ artificial intelligence and/or machine learning techniques to generate product designs and evaluate the candidate product designs.

The generative design engine 152 generates multiple candidate product designs based on the inputs received from the user and additional characteristics and/or constraints on the product being designed. The generative design engine 152 can generate the candidate product designs using an iterative process in which the generative design engine 152 generates multiple candidate designs based on the various inputs. The design evaluation engine 154 can evaluate the candidate product designs can generate one or more scores for each candidate product design based on the evaluation. The generative design engine 152 can select some of the candidate product designs based on the one or more scores, e.g., based on a combination of the one or more scores, and provide information about the selected candidate designs to the client computing device 110 for display to the user using a user interface 114. The generative design process can include multiple iterations in which candidate product designs are generated and scored, with each iteration being different based on the candidate product designs selected by the user at each iteration.

The inputs to the generative design process can include a product template that is selected by the user. The generative design platform 150 can maintain a design template database 162, or other appropriate data structure, that includes templates for multiple products, including multiple templates for each product or each type of product. The templates for a product can include variations of the product. For example, the templates for a rim for a vehicle can include templates for various size rims, templates for rims having different quantities of spokes, templates for different types of vehicles, e.g., some for sports cars and others for large trucks or heavy machinery.

In general, a template can specify baseline characteristics of the product and or valid ranges for these characteristics. For example, a template can specify a baseline size of each part of the product, a baseline shape of each product, material(s) that can be used for each part of the product, relationships between the parts, e.g., orientation, physical separation, attachment points, and/or attachment mechanisms, and/or other appropriate baseline characteristics of the product. At least some of these characteristics are modified by the generative design engine 152 when generating the candidate product designs.

A template can also include post-processing instructions. For example, the post-processing instructions can instruct the generative design engine 152, or another engine or system, on how to generate a complete product design based on a generatively designed subcomponent. In a particular example, a template for a wheel can include the baseline characteristics for a slice of the wheel and instructions for generating a complete wheel based on a slice of a wheel that is generatively designed using the template, the style grammar(s), etc.

The inputs to the generative design process also includes one or more style grammars. A style grammar is a set of stylistic parameters that define aesthetic characteristics of a group of related products. The generative design platform 150 can maintain a style grammar database 164, or other appropriate data structure, that includes style grammars for groups of products, e.g., brands, and/or subgroups. For example, there can be a style grammar for an overall brand and a style grammar for each type or other subgroup of products within the brand. In a particular example, the generative design platform 150 can include an overall style grammar for an athletic apparel manufacturer, a style grammar for golf related products, and a style grammar for basketball related products.

In general, a style grammar encodes a brand identity into a parametric description of a product or group of products. The stylistic parameters can define constraints on the characteristics of candidate product designs. For example, the stylistic parameters can include required characteristics and/or ranges or groups of characteristics that are considered to conform to the aesthetic characteristics of a brand. The generative design engine 152 can exclude any candidate designs that do not satisfy these constraints.

The stylistic parameters can also define characteristics against which candidate product designs can be evaluated and scored. For example, the stylistic parameters can define a target value or a range of values each having a corresponding score. For example, a characteristic can be a relative proportion of one part of a product, e.g., the roofline of a car, to the proportion of another part of the product, e.g., the wheelbase of the car. In this example, the closer the relative proportion of a candidate product design is to the target relative proportion, the higher the stylistic score for the candidate product design would be.

A style grammar can include parameters for various visual characteristics of a product. Some examples of these parameters include the size of a logo, the position of the logo on the product, color(s) of the product, materials of the product or each part of the product, the finish of the product or each part of the product, how curves are treated, e.g., the curvature comb, how transitions between curves are handled, corner radii, and relative proportion between parts of subcomponents. These visual characteristics can vary based on the product or type of product.

The style grammar can define the acceptable values and/or ranges for each visual characteristic. The use of ranges rather than specific values enables the generative design engine 152 to generate more product designs that users would likely not imagine on their own. For example, a style grammar for a brand can include a color palette of ranges of acceptable shades of colors and/or color combinations that define the style of the brand. The generative design engine 152 can use these customizable parameters to generate many different candidate product designs, and the users can refine the design process based on their selections to arrive at product designs that fit the style of the brand, satisfies other objectives, e.g., performance and/or manufacturability, and looks appealing to the users.

A style grammar can also be used to specify one or more obstacle bodies. An obstacle body defines an area of a product where material cannot be added. For example, a functional obstacle body can define that material cannot be added over the lug hole for inserting a lug nut through a rim as that would obstruct the lug hole making it non-functional. Functional obstacle bodies can be part of the template, a style grammar, or another constraint used by the generative design platform 150.

A stylistic obstacle body, which can be generated based on a style grammar, can prevent the generative design engine 152 from adding material to areas where it would change the aesthetics of the product such that aesthetics do not conform to the style defined by the style grammar. For example, an edge of products of a particular brand may have an angular design. Adding material to this edge may cause it to not have an angular appearance and thus not conform to the style of the brand. In another example, a stylistic obstacle body can specify that material cannot be added over an area that will include a logo. For a stylistic obstacle body, the style grammar can include an obstacle body parameter that specifies each area of the product where additional material cannot be added.

The generative design engine 152 can generate one or more stylistic obstacle bodies for the generative design process based on the style grammar(s). For example, the generative design engine 152 can generate multiple variations of a stylistic obstacle body for a particular part of a product based on the style grammar(s). That is, the generative design engine 152 can determine, based on the parameters of the style grammar(s), areas of the product where, if additional material were added, it would result in a product design that does not conform to the aesthetic characteristics for the product, as defined by the style grammar(s). In a particular example, a particular edge of each product may have a rounded look with a radius within a particular range. Adding material along the edge or either side of the edge may result in an out-of-range radius or a non-curved edge. Based on the requirements of the edge as defined by the parameters of the style grammar(s), the generative design engine 152 can create one or more obstacle bodies that prevent the generative design algorithm from applying material at the particular areas along or near the edge.

The inputs to the generative design process can also include physical constraints on the product. The physical constraints for products and/or types of products can be stored in a constraints database 166 or other appropriate data structure. In general, the physical constraints are related to the physical properties and/or required performance of the product. The types of physical constraints can vary based on the type of product and/or how the product will be used. For example, the physical constraint of a wheel may be to support a minimum weight and be within a particular size range. If the wheel is for a compact car, the weight requirement and size would be different from the weight requirement of a wheel for a work truck. A physical constraint on an engine part may be a minimum temperature tolerance.

The generative design process can also include additional user customizable inputs based on the product or use for the product. For example, if the product is going to be used as part of another product, e.g., a rim for a vehicle, the inputs can include information about the other product, e.g., a vehicle profile for the car, a driver profile for a driver of the vehicle. The vehicle profile can indicate various characteristics of the vehicle, such as the length, width, weight, maximum speed, maximum acceleration, etc. The driver profile can include data related to the way the user drives, e.g., average speed, speed at which the driver takes turns, acceleration, deceleration, etc. This information can be obtained from a set of sensors in communication with the client computing device 110 or the generative design platform 150. For example, an accelerometer of a mobile device or of the vehicle can provide acceleration data for a test drive or normal drive for the user.

The user interfaces 114 can enable the user to customize other characteristics of the product for input to the generative design process. For example, a product template can have one or more customizable characteristics. In a particular example, a product template for a shirt can include, as customizable characteristics, sleeve length, collar type, whether there are buttons and how far down the shirt, etc. In a car rim example, the customizable characteristics can include spoke type, style (e.g., racing, sport, off-road, standard, heavy duty, etc.), color, and/or finish.

The generative design engine 152 can perform a generative design process to generate candidate product designs based at least in part on the inputs. This can include varying a set of characteristics of the product and evaluating the product design to determine whether the resultant product design satisfies the stylistic and physical constraints for the product. The constraints and the obstacle bodies force the generative design process to generate product designs having aesthetics and performance that meets those constraints. Continuing the car rim example, this can include varying the hub offset (e.g., positive, negative, or neutral), the spoke base material, the spoke pattern and size, the number of spokes, and/or the proportion slice of the wheel. The characteristics that are varied in the generative design process can be based on the type of product and can be maintained by the generative design platform 150. In some implementations, these characteristics can be selected by the user and/or defined by the style grammar. For example, a style grammar may specify that a rim includes a particular number of spokes, that there is a minimum spacing between spokes, or that the rim include a particular style of spokes.

The design evaluation engine 154 evaluates each candidate product for one or more objectives and outputs a score for each objective based on the evaluation. One objective is conforming to the stylistic parameters of the style grammar(s) for the product design. In this evaluation, the design evaluation engine 154 can compare the visual characteristics of a candidate product design to each parameter of the style grammar. For example, if the style grammar includes, as a parameter, a range of shades of a color for a part of the product, the design evaluation engine 154 can compare the color of the part of the product to this color range and generate a score that indicates how well the color of the product matches or falls within the color range. A candidate product design with a color outside of the range would have a lower score (indicating lower conformity) than a candidate product design that is within the color range.

In another example, the design evaluation engine 154 an compare the radii of curves of the candidate design to the radii specified by a parameter of the style grammar. The score for this parameter can be based on how close the radii of the curves of the candidate product design are to the specified radii, e.g., the score can be higher the closer the radii are to the specified radii.

The design evaluation engine 154 can generate a style score based on the individual scores for the various parameters defined by each style grammar that is used as an input to the generative design process. The design evaluation engine 154 can combine the individual scores, with optional weights based on the importance of the parameter, to generate the style score. For example, the design evaluation engine 154 can determine an average, e.g., a weighted average, of the individual scores.

Another objective is a performance objective. There can be multiple performance objectives for a product. For example, the performance objectives for a cooler can be to maintain temperature and carry a minimum number or range in the number of products that can be stored in the cooler. For each performance objective, the design evaluation engine 154 can include a set of rules, models, or algorithms that the design evaluation engine 154 can apply to the product designs to determine the physical performance of the product design for each objective. An example rule may indicate that a particular material can sustain temperature within a particular range. A model can use the physical properties of materials and amounts of force placed on the spokes of a rim in various configurations, among other physical characteristics of a rim. Such a model can be used to determine the maximum weight of a vehicle that various designs of a rim can sustain. The design evaluation engine 154 can evaluate the candidate designs for each performance objective and generate a score for each performance objective based on the evaluation. Similar, to the style score, the individual scores can be weighted and combined for a total performance score or each performance score can be used in the candidate product design selection process and/or displayed to the user.

Another objective is a manufacturability objective. Such an objective can be used to determine whether the product design can be manufactured using a given manufacturing process and/or how well the product can be produced using the given manufacturing process. For example, many products can be manufactured using multiple different process. In a particular example, a plastic bottle can be manufactured using injection molding or blow molding. However, some may be more suitable for a product than others, e.g., depending on the shape and/or size of a plastic bottle. The design evaluation engine 154 can use a set of rules, models, or algorithms to determine, based on characteristics of a candidate product design, a measure of how manufacturable a product is using a given manufacturing process. For each given manufacturing process for a type of product, the design evaluation engine 154 can evaluate the characteristics of a candidate product design and generate a manufacturability score that represents a measure of manufacturability of the product using the given manufacturing process.

The design evaluation engine 155 can combine two or more of the scores, e.g., the style score, the performance score(s), and the manufacturability score for a specified manufacturing process to generate an overall score for each candidate product design. The overall score can be a weighted average of the scores using weights corresponding to the importance of each score.

The generative design engine 152 can select a subset of the candidate product designs based on the overall scores for the candidate product designs and provide information about these candidate product designs to the client-side application 112 for display to the user. The information can include the visual representation of each candidate product design, the overall score for each candidate product design, and/or the individual scores that are used to determine the overall score, e.g., the style score, the performance score(s), and/or the manufacturability score.

Figure 2:
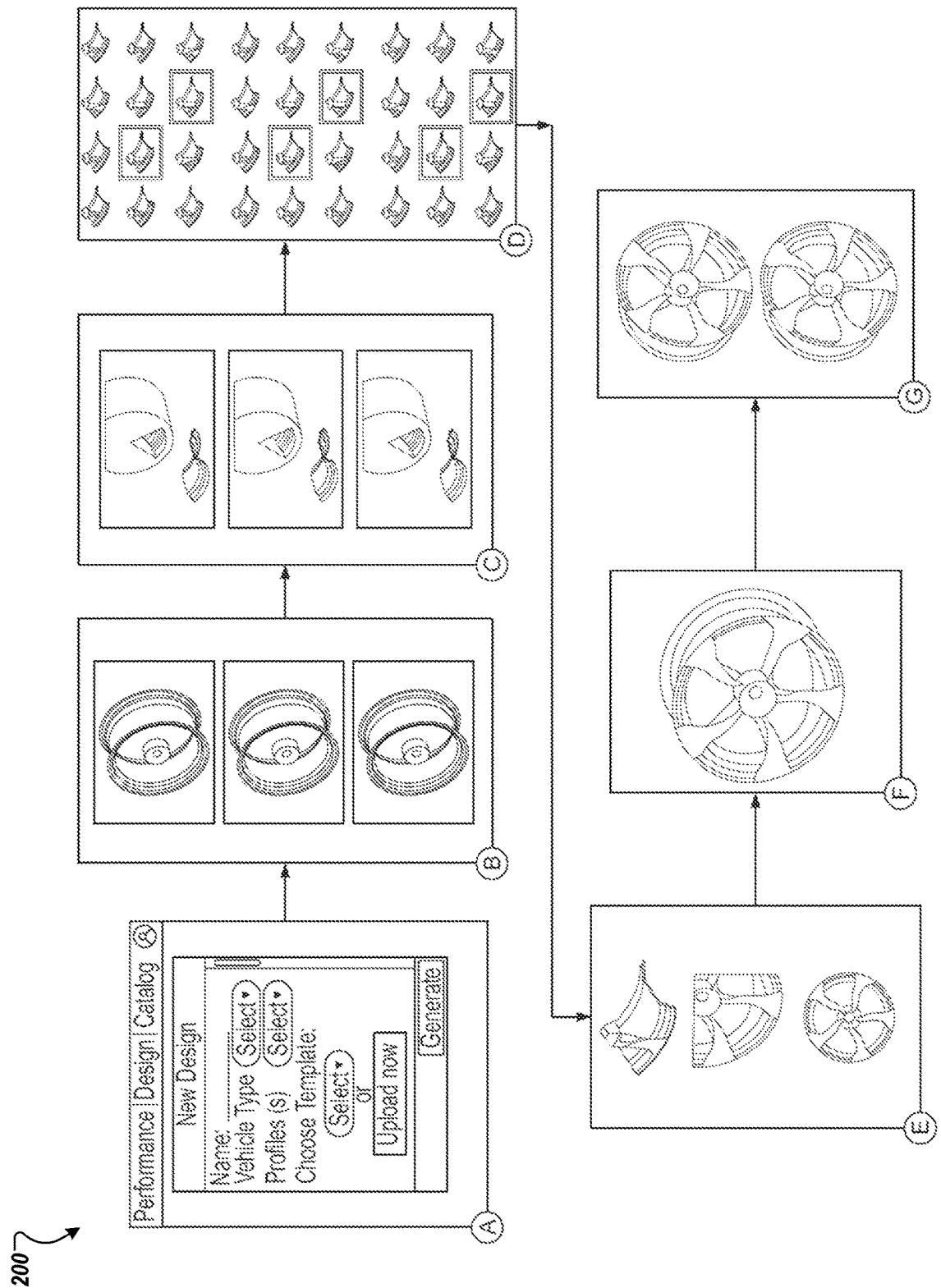
FIG. 2 shows a process for generating product designs using a style grammar.

FIG. 2 shows an example process 200 for generating product designs using a style grammar. In this example, the generative design platform 150 generates multiple product designs for a rim for a vehicle. In stage A, the generative design platform 150 receives data identifying a set of design parameters. The set of design inputs can be selected by a user using a client-side application 112. As described above, the inputs can include a selection of a product temple, a selection of one or more style grammars, and/or user-customizable inputs. The client-side application 112 can provide data identifying the user's selections to the generative design platform.

In stage B, the generative design platform 150 programmatically generates multiple design templates and obstacle bodies. The generative design platform 150 can generate the design templates based on the input data received from the user. Each design template can be a candidate product design, e.g., a candidate rim design. The generative design platform 150 generates each candidate product design by varying characteristics of the rim design, e.g., by varying the characteristics of the input rim template in ways that conform to the various stylistic constraints defined by the style grammar(s) and physical constraints for the rim. For example, the generative design platform 150 can vary the hub offset, the spoke base material, the spoke pattern, the spoke size, the number of spokes, and/or the proportion slice of the wheel. Each adjustment should conform to the stylistic and physical constraints and should not intrude on any obstacle bodies. In this example, three candidate rim designs are shown but many more are possible at this stage.

In stage C, the generative design platform 150 applies various design parameters, such as obstacles and forces. In some cases, the obstacle body can be in the form of an inverse of a rim design. The generative design platform 150 can apply the obstacle bodies at this stage to prevent the addition of material to the candidate rim designs in areas where material cannot be added, e.g., for brand aesthetic and/or functional purposes.

In stage D, the generative design platform 150 runs the generative design process and automatically selects the best, e.g., highest scoring designs. For example, as described above, the generative design platform 150 can iteratively generate multiple candidate product designs using the template(s), the style grammar(s), obstacle bodies, and other constraints, and evaluate each candidate product design based on style, performance, and/or manufacturability, The generative design platform 150 can also generate one or more scores. In this example, the style score can be based on the visual characteristics of the individual spokes, the number of spokes, the spacing between spokes, visual characteristics of the lug holes, visual characteristics of the center bore, the curvature of each edge of the rim, and/or other visual characteristics having a corresponding style parameter defined by the style grammar(s). The generative design platform 150 can select the candidate rim designs having the highest scores.

In stage E, the generative design platform 150 can revolve, process, and cleanup the selected candidate rim designs. This can include refining the geometric shapes of the rim design based on manufacturing specifications, style grammar constraints, manufacturability, etc. In general, this stage can finalize each candidate rim design such that the design is ready for manufacturing if selected by the user as a final design choice. For example, this stage can generate a complete and usable product from the generatively designed product. This can include manual refinement in some cases. In the illustrated example, this stage can include taking the portion of the rim generatively designed in the previous stages and generating a complete wheel. For example, a user may identify a preferred candidate product design, but want to redesign it or change some fillets to be manufacturable with a different method. The generative design platform 150 can provide user interface controls that enable users to make manual modifications to the product designs.

In stage F, the generative design platform 150 evaluates the selected candidate rim designs for an overall design, performance, and brand consistency. In this stage, an entire product design of the product can be evaluated more thoroughly than the evaluations in stage D. For example, in stage D, a part of the wheel, e.g., the rim, can be evaluated to generatively design a rim as a subcomponent of a wheel. In stage F, a selected rim design can be evaluated as part of a completed wheel, e.g., after any refinements to the overall design have been incorporated into the wheel. This evaluation can be more comprehensive and more accurate than the evaluations performed in stage D.

In stage G, the selected candidate designs are displayed to the user. The user interface 114 of the client-side application 112 can display a visual representation of each selected candidate rim design and optionally the score(s) used to select the candidate rim designs that are displayed to the user.

Figure 3:
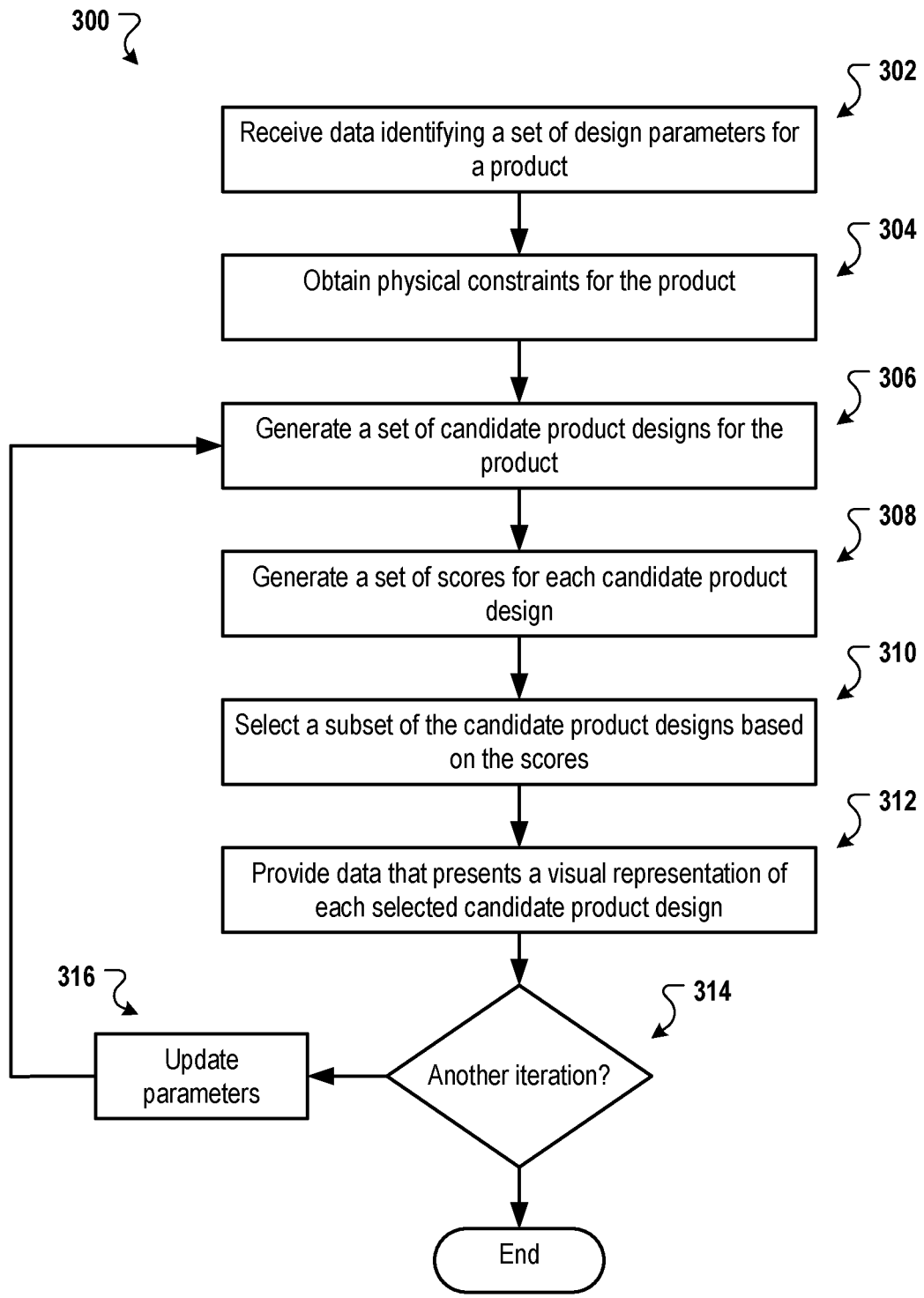
FIG. 3 is a flow diagram of an example process for generating products designs using style grammars.

FIG. 3 is a flow diagram of an example process 300 for generating products designs using style grammars. The process 300 can be performed, for example, by the generative design platform 150 of FIG. 1, which can be implemented as a system of one or more computers. Operations of the process 300 can also be implemented as instructions stored on one or more computer readable media which may be non-transitory, and execution of the instructions by one or more data processing apparatus can cause the one or more data processing apparatus to perform the operations of the process 300. For brevity, the process 300 is described as being performed by the generative design platform 150.

The generative design platform 150 receives data identifying a set of design parameters for a product (302). The design parameters can include a product template for the product and one one or more style grammars. The user can select, from a set of product templates, a particular product template for use in generating multiple candidate product designs. The user can also select, from a set of style grammars one or more styles grammars for generating the candidate product designs. For example, the user can select a style grammar for an overall brand and one or more style grammars for product types or sub-brands within the brand. In a particular example, the product can be a shoe and the user can select a style grammar for an athletic apparel brand. The user can also select a style grammar for a particular sport, e.g., basketball, and/or for a particular sub-brand within the overall athletic apparel brand, e.g., a sub-brand for outdoors enthusiasts. Each style grammar can include a set of stylistic parameters that define aesthetic characteristics of a group of products within the brand, sub-brand, or type of products.

Advantageously, a user can select a style grammar for a different type of product than the one for which candidate product designs are being generated, or for no particular product at all. For example, the style grammar for a brand may not be product specific and can instead include parameters extracted from different types of products within the brand. This enables the user and the generative design platform 150 to collaborate on the design of other types of products that conform to the style of the brand. In addition, this enables the generative design platform 150 to apply the styles of one type of product to a different type of product, which makes it faster and more efficient to design one-off products that that are different from other products manufactured by the company.

The user can also provide, as input, additional preferences that can be used in the generative design process. These additional preferences can be functional and/or stylistic. For example, as described above, a user can provide a driver profile that can be used in designing rims or other parts of a vehicle that satisfy the functional demands for that driver. In another example, the user can specify preferred color schemes, logo size or placement, and/or other visual preferences for the product. The user's visual preferences can also be determined, for example, by collecting data on the most popular product designs sold, selecting product designs that look most like the user's past designs, and/or using an individual's selections of past product designs that the user preferred. The user's visual preferences can be determined using conjoint analysis, sentiment analysis, and/or genetic algorithms.

The generative design platform 150 obtains, for the product, one or more physical constrains on a design of the product (304). The physical constraints for products and/or types of products can be stored in a constraints database 166 or other appropriate data structure. As described above, the physical constraints are related to the physical properties and/or required performance of the product.

The generative design platform 150 generates a set of candidate product designs for the product (306). As described above, the generative design platform 150 can generate the candidate product designs by varying a set of characteristics of the product template in accordance with the stylistic constraints, physical constraints, and any obstacle bodies defined by (or generated based on) the style grammar(s) and physical constraints.

The generative design platform 150 generates a set of scores for each candidate product design (308). The scores can include a style score that represents a measure of how well the candidate product design conforms to the aesthetic characteristics of each style grammar. To determine the style score, the generative design platform 150 can compare the visual characteristics of a candidate product design to each parameter of the style grammar. For example, if the style grammar includes, as a parameter, a range of shades of a color for a part of the product, the design evaluation engine 154 can compare the color of the part of the product to this color range and generate a score that indicates how well the color of the product matches or falls within the color range. A candidate product design with a color outside of the range would have a lower score (indicating lower conformity) than a candidate product design that is within the color range.

The scores can also include a performance score and/or a manufacturability score. The performance score represents a measure of how well the candidate product design satisfies one or more performance objectives for the product. The manufacturability score represents a measure of manufacturability of the product using a specified manufacturing process.

The scores can also include a design cost. The design cost for a candidate product design can be an estimate of the cost to manufacture the product using the candidate product design. The generative design platform 150 can estimate the design cost based on, for example, the materials used in the product design, the amount of each material required, the manufacturing process that will be used to manufacture the product, and/or other appropriate factors.

Although only one iteration of steps 306 and 308 are illustrated in FIG. 3, the generative design platform 150 can perform multiple iterations of these two steps prior to moving to step 310.

For example, the generative design platform 150 can generate multiple product designs and evaluate the product designs until converging on a set of candidate designs for which information is presented to the user. Convergence can be met when it is determined that changing the characteristics of the candidate product designs do not result in a significant, e.g., at least a threshold, change in the scores between successive iterations. Other convergence conditions can also be used.

The generative design platform 150 selects, based on the set of scores for each candidate product design, a subset of the candidate product designs (310). The subset can be a proper subset which includes fewer than all members of the set, or the entire set of candidate product designs. In some implementations, the generative design platform 150 generates an overall score for each candidate product design based on the set of scores for the candidate product design. The generative design platform 150 can then select a specified number of the candidate product designs based on the overall scores. For example, the generative design platform 150 can select a specified number of candidate product designs having the highest overall scores.

The generative design platform 150 provides, to a client computing device, data that causes the client computing device to present a visual representation, e.g., computer-generated image, of each selected candidate product design. For example, the generative design platform 150 can provide, to the client computing device, data that instructs a client-side application to update a user interface to present the visual representation of each selected candidate product design. The data can also cause the client-side application to present the scores for each selected candidate product design, e.g., the overall scores, the style scores, the performance scores, the manufacturability score, and/or the design cost.

The generative design platform 150 determines whether to perform another iteration of the generative design process (314). The generative design platform 150 can perform another iteration in response to the user selecting some of the candidate product designs displayed to the user by the client-side application. Or, if the user selects one of the candidate product designs as a final product design, the process 300 can end. The product design can then be used as the basis for manufacturing the product. For example, the product design can be sent to a product lifecycle management (PLM) tool for final costing and manufacturing.

If another iteration is performed, the generative design platform 150 can update the parameters of the generative design process based on the user's selection of candidate product designs (316). For example, the generative design platform 150 can evaluate characteristics of the selected candidate product designs and characteristics of the non-selected candidate product designs. In this evaluation, the generative design platform 150 can identify similarities between the selected candidate product designs, e.g., similarities in visual characteristics such as color, curve radii, number of spokes (if the product is a rim), etc. The generative design platform 150 can identify similarities in scores, e.g., if the user selected product designs having high style scores but low manufacturability scores, it indicates that the user considers style more important than manufacturability.

The generative design platform 150 can also identify differences between the selected candidate product designs and the non-selected candidate product designs. For example, the generative design platform 150 can identify differences in visual characteristics of the selected candidate product designs and the non-selected candidate product designs.

The generative design platform 150 can update the parameters, for example, by adjusting weights associated with the similar characteristics and the different characteristics. For example, For example, if the user selects candidate product designs that better conform with the color parameter defined by a style grammar, the generative design platform 150 can increase the weight for that parameter. The generative design platform 150 can also adjust the scoring process to increase the scores for product designs having the characteristics that are similar between the selected candidate product designs. The generative design platform 150 can also reduce the scores for candidate product designs that have the characteristics that are identified as being different from the selected candidate product designs. In some implementations, the user can also specify, using a user interface of the client-side application, visual characteristics of candidate product designs that user wants the next set of candidate product designs to include.

After updating the parameters, the generative design platform 150 performs steps 306 to 312 for another iteration of the generative design process. The generative design platform 150 can repeat these steps for multiple iterations until the user selects a final product design for the product.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a user device, e.g., for purposes of displaying data to and receiving user input from a user interacting with the user device, which acts as a client. Data generated at the user device, e.g., a result of the user interaction, can be received from the user device at the server.

Figure 4:
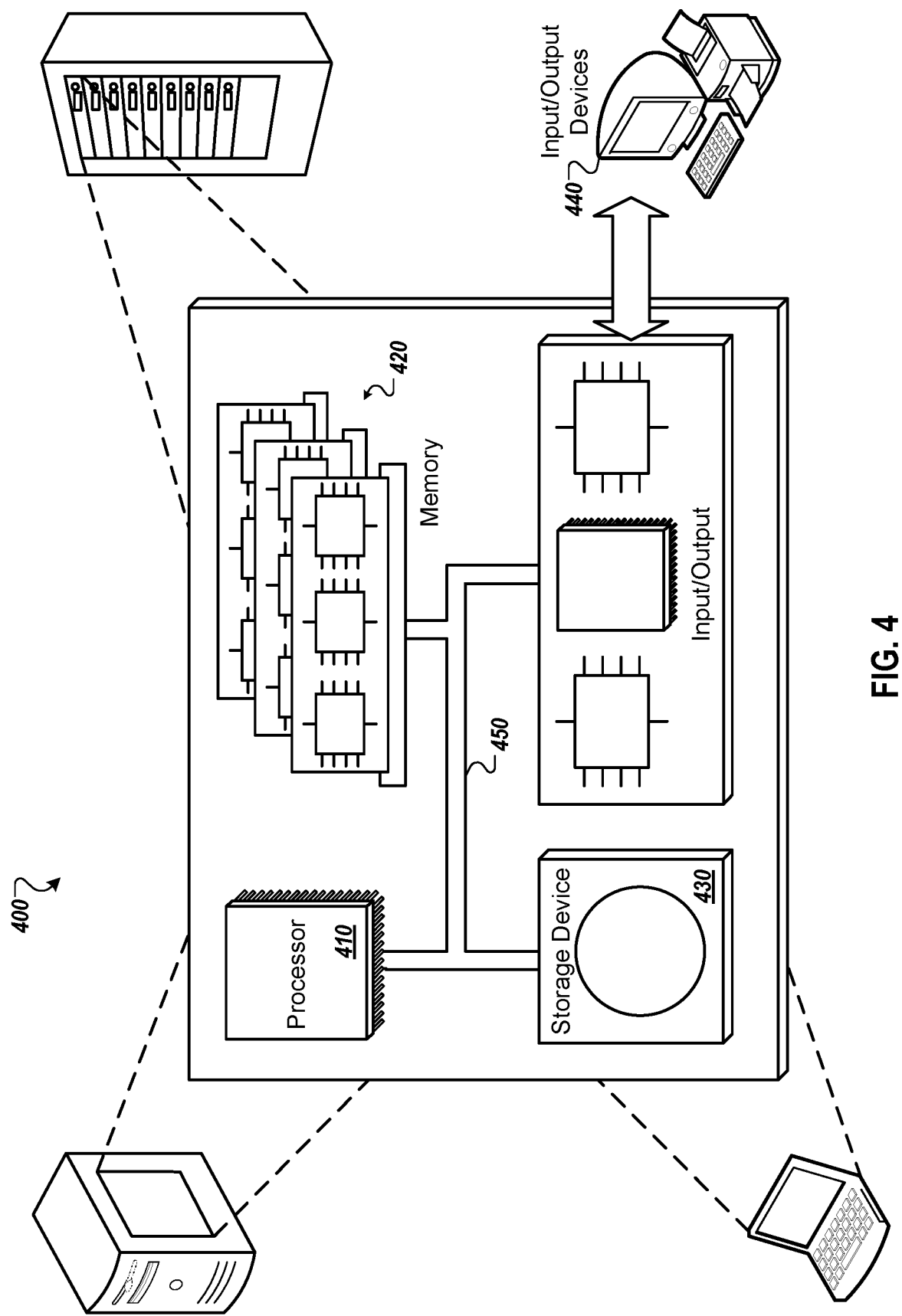
FIG. 4 is a block diagram of a computing system that can be used in connection with computer-implemented methods described in this document.

An example of one such type of computer is shown in FIG. 4, which shows a schematic diagram of a computer system 400. The system 400 can be used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
    receiving, from a client computing device of a user, data identifying a set of design parameters comprising a product template for a product and one or more style grammars for the product, wherein each style grammar comprises a set of stylistic parameters that define aesthetic characteristics of a group of related products;
    obtaining, for the product, one or more physical constraints on a design of the product;
    identifying, based on the one or more style grammars, one or more obstacle bodies that each specifies an area of the product at which material should not be added to ensure conformance with the aesthetic characteristics of the group of related products;
    generating, based on the product template, each style grammar, and the one or more physical constraints, a set of candidate product designs for the product, comprising preventing material from being added at the areas specified by the one or more obstacle bodies;
    generating, by evaluating each candidate product design in the set of candidate product designs, a set of scores for each candidate product design, the set of scores including a style score representing a measure of how well the candidate product design conforms to the aesthetic characteristics of each style grammar and a performance score representing a measure of how well the candidate product design satisfies one or more performance objectives for the product;
    selecting, based on the set of scores for each candidate product design, a subset of the candidate product designs; and
    providing, to the client computing device, data that causes the client computing device to present, for each candidate product design, a visual representation of the candidate product design.

2. The method of claim 1, wherein each aesthetic constraint defined by each style grammar is a non-functional constraint that is unrelated to functionality of the group of products.

3. The method of claim 1, wherein the set of scores for each candidate product design comprises a manufacturability score that represents a measure of manufacturability of the product using a specified manufacturing process.

4. The method of claim 1, wherein the stylistic parameters of a given style grammar defines at least one of (i) a three-dimensional physical relationship between two or more parts of the product, (ii) a size and/or position of a logo, (iii) a color scheme, (iv) one or more materials for the product, (v) a finish of the product, or (vi) geometric parameters defining characteristics of curves on one or more surfaces.

5. The method of claim 1, wherein the set of design parameters further comprises a user profile comprising user-specific design constraints.

6. The method of claim 1, wherein receiving the data identifying the set of design parameters comprises receiving selection data specifying selection of the one or more style grammars from a set of available style grammars.

7. The method of claim 1, further comprising:
for each of one or more iterations:
    receiving, from the client computing device, selection data identifying selected candidate product designs selected by the user of the client computing device;
    identifying one or more similar characteristics between the selected candidate product designs;
    generating, based on the product template, each style grammar, the one or more physical constraints and the one or more similar characteristics, an updated set of candidate product designs for the product; and
    providing, to the client computing device, data that causes the client computing device to present, for each candidate product design in the updated set of candidate product designs, a visual representation of the candidate product design.

8. The method of claim 1, wherein a first style grammar of the one or more style grammars defines a first set of stylistic parameters that define aesthetic characteristics of a type of product corresponding to the product and a second style grammar of the one or more style grammars defines a second set of stylistic parameters that define aesthetic characteristics of multiple types of products including the type of product corresponding to the product.

9. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
receiving, from a client computing device of a user, data identifying a set of design parameters comprising a product template for a product and one or more style grammars for the product, wherein each style grammar comprises a set of stylistic parameters that define aesthetic characteristics of a group of related products;
obtaining, for the product, one or more physical constraints on a design of the product;
identifying, based on the one or more style grammars, one or more obstacle bodies that each specifies an area of the product at which material should not be added to ensure conformance with the aesthetic characteristics of the group of related products;
generating, based on the product template, each style grammar, and the one or more physical constraints, a set of candidate product designs for the product, comprising preventing material from being added at the areas specified by the one or more obstacle bodies;
generating, by evaluating each candidate product design in the set of candidate product designs, a set of scores for each candidate product design, the set of scores including a style score representing a measure of how well the candidate product design conforms to the aesthetic characteristics of each style grammar and a performance score representing a measure of how well the candidate product design satisfies one or more performance objectives for the product;
selecting, based on the set of scores for each candidate product design, a subset of the candidate product designs; and
providing, to the client computing device, data that causes the client computing device to present, for each candidate product design, a visual representation of the candidate product design.

10. The computer-implemented system of claim 9, wherein each aesthetic constraint defined by each style grammar is a non-functional constraint that is unrelated to functionality of the group of products.

11. The computer-implemented system of claim 9, wherein the set of scores for each candidate product design comprises a manufacturability score that represents a measure of manufacturability of the product using a specified manufacturing process.

12. The computer-implemented system of claim 9, wherein the stylistic parameters of a given style grammar defines at least one of (i) a three-dimensional physical relationship between two or more parts of the product, (ii) a size and/or position of a logo, (iii) a color scheme, (iv) one or more materials for the product, (v) a finish of the product, or (vi) geometric parameters defining characteristics of curves on one or more surfaces.

13. The computer-implemented system of claim 9, wherein the set of design parameters further comprises a user profile comprising user-specific design constraints.

14. The computer-implemented system of claim 9, wherein receiving the data identifying the set of design parameters comprises receiving selection data specifying selection of the one or more style grammars from a set of available style grammars.

15. The computer-implemented system of claim 9, wherein the operations comprise:
for each of one or more iterations:
receiving, from the client computing device, selection data identifying selected candidate product designs selected by the user of the client computing device;
identifying one or more similar characteristics between the selected candidate product designs;
generating, based on the product template, each style grammar, the one or more physical constraints and the one or more similar characteristics, an updated set of candidate product designs for the product; and
providing, to the client computing device, data that causes the client computing device to present, for each candidate product design in the updated set of candidate product designs, a visual representation of the candidate product design.

16. The computer-implemented system of claim 9, wherein a first style grammar of the one or more style grammars defines a first set of stylistic parameters that define aesthetic characteristics of a type of product corresponding to the product and a second style grammar of the one or more style grammars defines a second set of stylistic parameters that define aesthetic characteristics of multiple types of products including the type of product corresponding to the product.

17. A non-transitory, computer-readable medium storing one or more instructions that, when executed by a computer system, cause the computer system to perform operations comprising:
receiving, from a client computing device of a user, data identifying a set of design parameters comprising a product template for a product and one or more style grammars for the product, wherein each style grammar comprises a set of stylistic parameters that define aesthetic characteristics of a group of related products;
obtaining, for the product, one or more physical constraints on a design of the product;
identifying, based on the one or more style grammars, one or more obstacle bodies that each specifies an area of the product at which material should not be added to ensure conformance with the aesthetic characteristics of the group of related products;
generating, based on the product template, each style grammar, and the one or more physical constraints, a set of candidate product designs for the product, comprising preventing material from being added at the areas specified by the one or more obstacle bodies;
generating, by evaluating each candidate product design in the set of candidate product designs, a set of scores for each candidate product design, the set of scores including a style score representing a measure of how well the candidate product design conforms to the aesthetic characteristics of each style grammar and a performance score representing a measure of how well the candidate product design satisfies one or more performance objectives for the product;

selecting, based on the set of scores for each candidate product design, a subset of the candidate product designs; and providing, to the client computing device, data that causes the client computing device to present, for each candidate product design, a visual representation of the candidate product design.

18. The non-transitory, computer-readable medium of claim 17, wherein each aesthetic constraint defined by each style grammar is a non-functional constraint that is unrelated to functionality of the group of products.

* * * * *